(12) United States Patent
Nonoshita et al.

(10) Patent No.: US 10,315,724 B2
(45) Date of Patent: Jun. 11, 2019

(54) COMPOSITE BICYCLE COMPONENT

(71) Applicant: Shimano Inc., Sakai, Osaka (JP)

(72) Inventors: Tetsu Nonoshita, Osaka (JP); Toyoshi Yoshida, Osaka (JP); Wataru Yamauchi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/739,532

(22) Filed: Jan. 11, 2013

(65) Prior Publication Data
US 2014/0196569 A1 Jul. 17, 2014

(51) Int. Cl.
*B62M 3/00* (2006.01)
*B62K 19/16* (2006.01)

(52) U.S. Cl.
CPC .............. *B62M 3/00* (2013.01); *B62K 19/16* (2013.01); *Y10T 74/2165* (2015.01)

(58) Field of Classification Search
CPC ........... B62M 1/36; B62M 3/00; B62K 19/16; B29C 45/1657
See application file for complete search history.

(56) References Cited

U.S. PATENT DOCUMENTS

| | | | | |
|---|---|---|---|---|
| 6,099,939 | A * | 8/2000 | Mittal | C23C 14/024 257/E21.576 |
| 7,263,914 | B2 * | 9/2007 | Ording et al. | 74/594.1 |
| 7,503,864 | B2 | 3/2009 | Nonoshita et al. | |
| 7,527,277 | B2 | 5/2009 | Nonoshita et al. | |
| 7,610,832 | B2 * | 11/2009 | Dal Pra' | 74/594.1 |
| 7,650,818 | B2 | 1/2010 | Inoue et al. | |
| 7,850,564 | B2 | 12/2010 | Nonoshita | |
| 7,967,709 | B2 | 6/2011 | Emura et al. | |
| 2005/0126742 | A1 * | 6/2005 | Yamamura et al. | 164/479 |
| 2007/0186718 | A1 * | 8/2007 | Chiang | 74/594.1 |
| 2008/0312016 | A1 | 12/2008 | Chiang et al. | |
| 2009/0081407 | A1 * | 3/2009 | Giraud | B29C 37/0082 428/98 |
| 2012/0042746 | A1 | 2/2012 | Nonoshita et al. | |
| 2013/0068066 | A1 * | 3/2013 | Staples et al. | 74/594.1 |
| 2013/0324325 | A1 * | 12/2013 | Maxwell | A63B 37/0019 473/377 |

FOREIGN PATENT DOCUMENTS

| | | | | |
|---|---|---|---|---|
| CN | 202657183 U | | 1/2013 | |
| TW | 201125721 A | * | 8/2011 | B32B 15/08 |

* cited by examiner

*Primary Examiner* — Vicky A Johnson
(74) *Attorney, Agent, or Firm* — Gobal IP Counselors, LLP

(57) ABSTRACT

A composite bicycle component includes a first member made of a metallic material. The first member has a surface with a first dimple. The first dimple includes a second dimple that is formed on the first dimple. Preferably, the composite bicycle component further includes a second member attached to the first member so that a part of the second member extends into the first and second dimples.

22 Claims, 15 Drawing Sheets

COMPOSITE BICYCLE COMPONENT

BACKGROUND

Field of the Invention

This invention generally relates to a composite bicycle component made of two or more parts that are attached to each other.

Background Information

In the past, most bicycle components were constructed of mainly metal parts. For example, in the past, crank arms, crank axles and chain rings were made of a single piece of metal such as a forged metal member. Thus, these bicycle components were relatively heavy. More recently, bicycle components have been constructed of lighter weight metal alloys and/or have been constructed of several pieces in order to reduce weight. Examples of some composite bicycle components are disclosed in U.S. Pat. No. 7,650,818 B2, U.S. Patent Application Publication No. 2008/0312016 A1 and U.S. Patent Application Publication No. 2012/0042746 A1.

SUMMARY

Generally, the present disclosure is directed to various composite bicycle components made of two or more parts that are attached together. Thus, one object of the present disclosure is to provide a composite bicycle component in which at least two parts are securely attached together.

In accordance with a first aspect of the present invention, a composite bicycle component is proposed that basically comprises a first member made of a metallic material. The first member has a surface with a first dimple. The first dimple includes a second dimple that is formed on the first dimple.

In accordance with second aspect of the present invention, the composite bicycle component according to the first aspect further comprises a second member including at least a portion being made of a resin.

In accordance with third aspect of the present invention, the composite bicycle component according to the second aspect is configured so that the resin of the second member extends into the first and second dimples of the first member that creates an anchor effect to fix the first and second members to each other.

In accordance with fourth aspect of the present invention, the composite bicycle component according to the first aspect is configured so that the first member has a plurality of the first dimples.

In accordance with fifth aspect of the present invention, the composite bicycle component according to the fourth aspect is configured so that the first member has a plurality of the second dimples formed on each of the plurality of the first dimples.

In accordance with sixth aspect of the present invention, the composite bicycle component according to the first aspect is configured so that the first member has a plurality of the second dimples formed on the first dimple.

In accordance with seventh aspect of the present invention, the composite bicycle component according to the first aspect is configured so that the first dimple has a maximum dimension that is larger than a maximum dimension of the second dimple.

In accordance with eighth aspect of the present invention, the composite bicycle component according to the first aspect is configured so that the maximum dimension of the first dimple is equal to or smaller than two microns.

In accordance with ninth aspect of the present invention, the composite bicycle component according to the eighth aspect is configured so that the maximum dimension of the second dimple is equal to or smaller than 0.2 micron.

In accordance with tenth aspect of the present invention, the composite bicycle component according to the first aspect is configured so that the maximum dimension of the second dimple is equal to or smaller than 0.2 micron.

In accordance with eleventh aspect of the present invention, the composite bicycle component according to the second aspect is configured so that the first and second members are attached to each other by an integral molding process.

In accordance with twelfth aspect of the present invention, the composite bicycle component according to the second aspect is configured so that the first and second members are attached to each other by adhesive.

In accordance with thirteenth aspect of the present invention, the composite bicycle component according to the first aspect is configured so that the composite bicycle component is manufactured by the process of forming the first dimple and the second dimple on the first member.

In accordance with fourteenth aspect of the present invention, the composite bicycle component according to the first aspect is configured so that the composite bicycle component is a bicycle crank arm.

In accordance with fifteenth aspect of the present invention, the composite bicycle component according to the first aspect is configured so that the composite bicycle component is a bicycle sprocket.

In accordance with sixteenth aspect of the present invention, the composite bicycle component according to the first aspect is configured so that the composite bicycle component is a bicycle crank axle.

In accordance with a seventeenth aspect of the present invention, a composite bicycle component is proposed that basically comprises a first member and a second member. The first member is made of metallic material, and has a surface with a first dimple. The first dimple includes a second dimple that is formed on the first dimple. The second member includes at least a portion being made of a resin. The resin of the second member extends into the first and second dimples of the first member to fix the first and second members to each other.

In accordance with eighteenth aspect of the present invention, the composite bicycle component according to the seventeenth aspect is configured so that the first member has a plurality of the first dimples.

In accordance with nineteenth aspect of the present invention, the composite bicycle component according to the eighteenth aspect is configured so that the first member has a plurality of the second dimples formed on each of the plurality of the first dimples.

In accordance with twentieth aspect of the present invention, the composite bicycle component according to the seventeenth aspect is configured so that the first member has a plurality of the second dimples formed on the first dimple.

In accordance with twenty-first aspect of the present invention, the composite bicycle component according to the seventeenth aspect is configured so that the first dimple has a maximum dimension that is larger than a maximum dimension of the second dimple.

In accordance with twenty-second aspect of the present invention, the composite bicycle component according to the seventeenth aspect is configured so that the maximum dimension of the first dimple is equal to or smaller than two microns.

In accordance with twenty-third aspect of the present invention, the composite bicycle component according to the twenty-second aspect is configured so that the maximum dimension of the second dimple is equal to or smaller than 0.2 micron.

In accordance with twenty-fourth aspect of the present invention, the composite bicycle component according to the seventeenth aspect is configured so that the maximum dimension of the second dimple is equal to or smaller than 0.2 micron.

In accordance with twenty-fifth aspect of the present invention, the composite bicycle component according to the seventeenth aspect is configured so that the first and second members form a composite bicycle crank arm.

In accordance with twenty-sixth aspect of the present invention, the composite bicycle component according to the seventeenth aspect is configured so that the first and second members form a composite bicycle sprocket.

In accordance with twenty-seventh of the present invention, the composite bicycle component according to the seventeenth aspect is configured so that the first and second members form a composite bicycle crank axle.

In accordance with twenty-eighth aspect of the present invention, the composite bicycle component according to the seventeenth aspect is configured so that the composite bicycle component being manufactured by the processes of forming the first dimple and the second dimple on the first member, and attaching the first and second members to each other by an integral molding process so that the resin of the second member at least partially extends into the first and second dimples of the first member.

Other objects, features, aspects and advantages of the disclosed composite bicycle components will become apparent to those skilled in the art from the following detailed description, which, taken in conjunction with the annexed drawings, discloses various composite bicycle components used in a bicycle crank assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
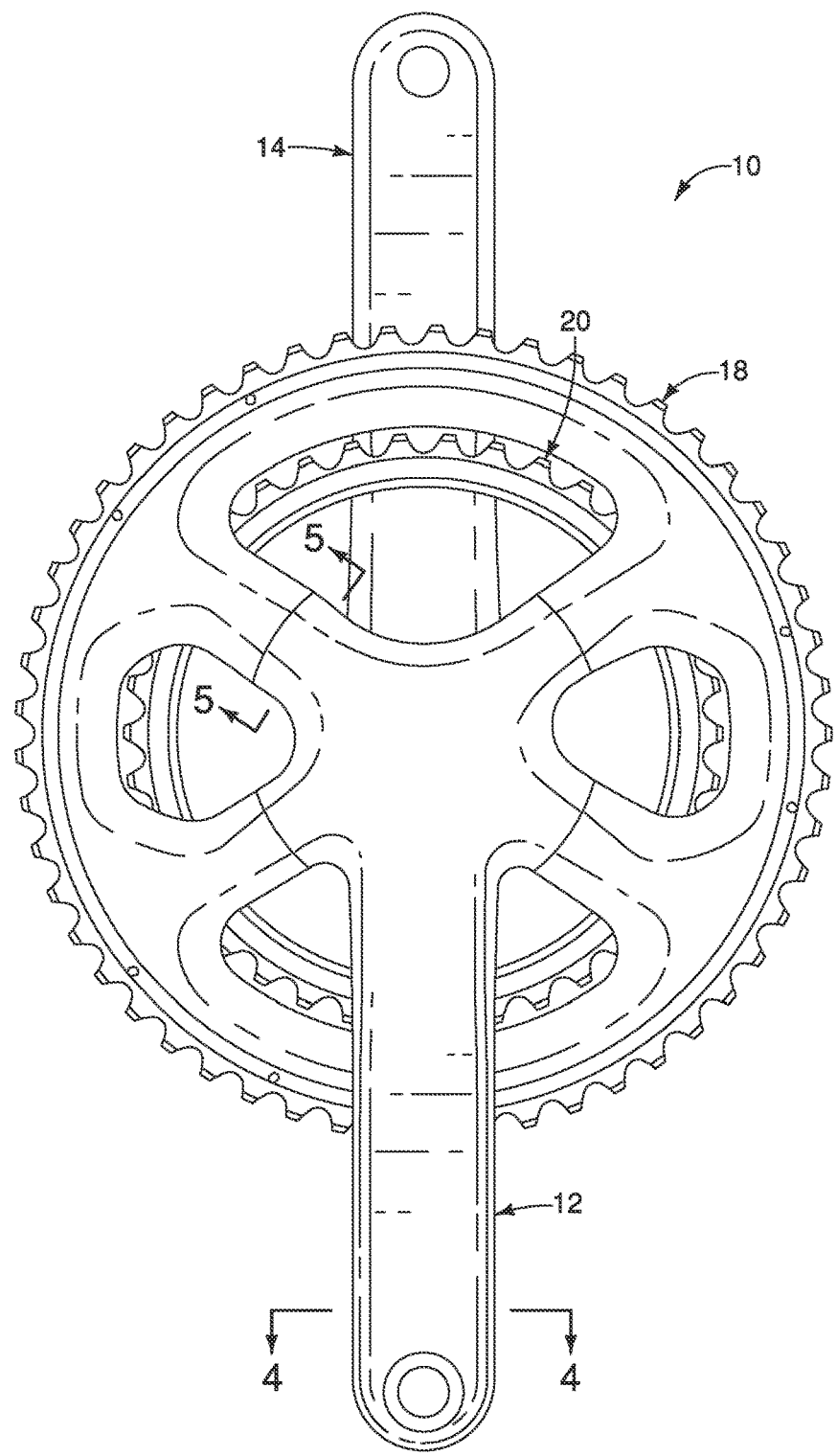
FIG. 1 is an outside elevational view of a bicycle crank assembly that includes composite bicycle components in accordance with one illustrated embodiment.
Figure 2:
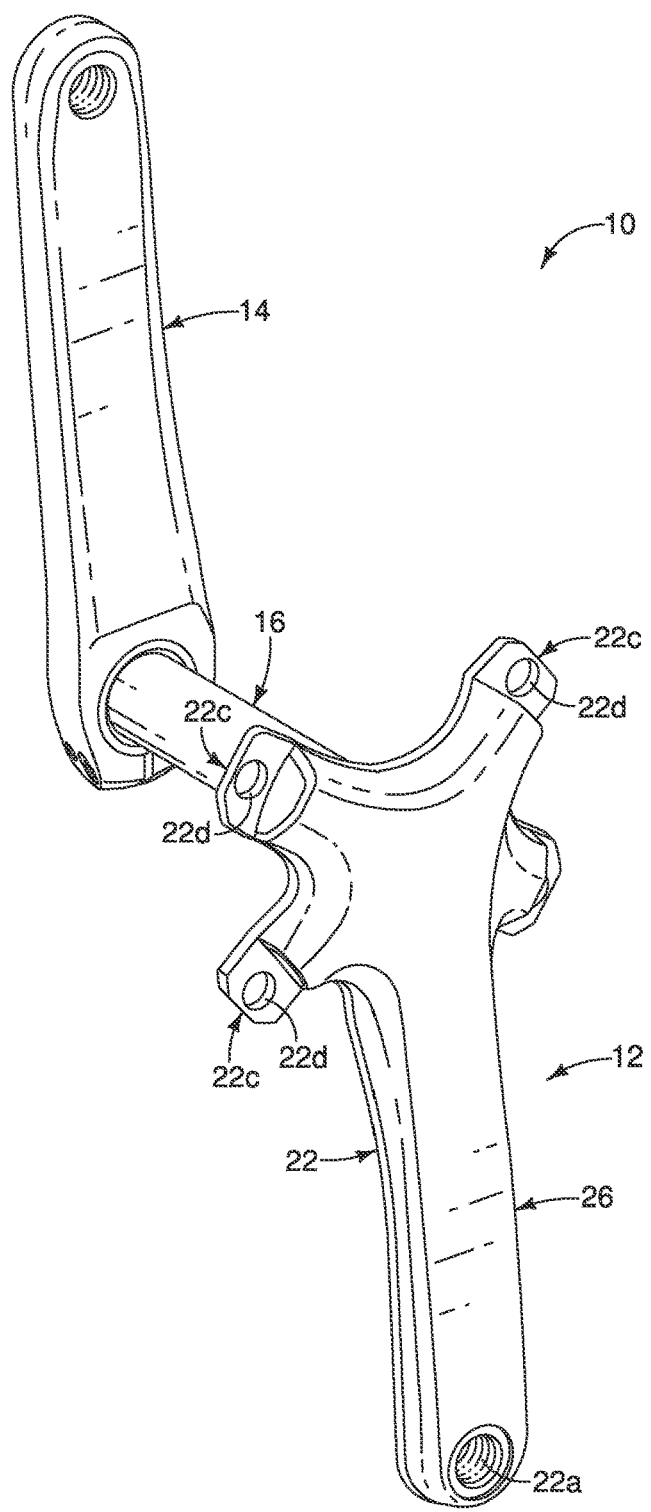
FIG. 2 is a perspective view of the crank arms and the crank axle of the bicycle crank assembly illustrated in FIG. 1.

Referring initially to FIGS. 1 and 2, a bicycle crank assembly 10 is illustrated in accordance with one embodiment. The bicycle crank assembly 10 basically includes a first (right) composite crank arm 12, a second (left) composite crank arm 14, a hollow composite crank axle 16, an outer composite chain ring 18 and an inner metal chain ring 20. In the illustrated embodiment, the crank arm 12, the crank arm 14, the crank axle 16 and the chain ring 18 are examples of composite bicycle components (i.e. a component including two or more members that are secured together to form a non-separable unit). In the illustrated embodiment, each of the crank arm 12, the crank arm 14, the crank axle 16 and the chain ring 18 includes one or more metallic parts and one or more resin parts that are secured together so as to be comparable in rigidity to an all metallic component while also providing weight-saving as compared to an all metallic component. However, the present invention is not limited to these examples of composite bicycle components. Rather, other composite bicycle components, such as a composite brake lever, a composite shift lever, a composite hub axle, a composite front derailleur, a composite rear derailleur, a composite bottom bracket assembly, a composite suspension assembly, a composite hub assembly, a composite wheel assembly, a composite frame assembly, and so on, can be formed that are constructed based on the teachings of this disclosure.

Referring to FIG. 3 to 7, the crank arm 12 basically includes a base member 22, a support member 24 and a front cover member 26. The base member 22 and the front cover member 26 are both made of a metallic material (e.g., an aluminum alloy, a magnesium alloy, a titanium alloy, or other suitable metallic materials), and constitute examples of a first member of a composite bicycle component. Thus, a composite bicycle component according to the present invention comprises a first member made of a metallic material. The support member 24 is made of a hard plastic resin or a fiber reinforced resin. In the illustrated embodiment, the support member 24 is made of a fiber reinforced resin such as a carbon fiber-reinforced plastic or polymer (FRP), and constitutes an example of a second member of a composite bicycle component. Thus, a composite bicycle component according to the present invention may further comprise a second member including at least a portion made of a resin. The crank arm 14 has a similar three part construction as the crank arm 12. Thus, the construction of the crank arm 14 will not be discussed.

Figure 3:
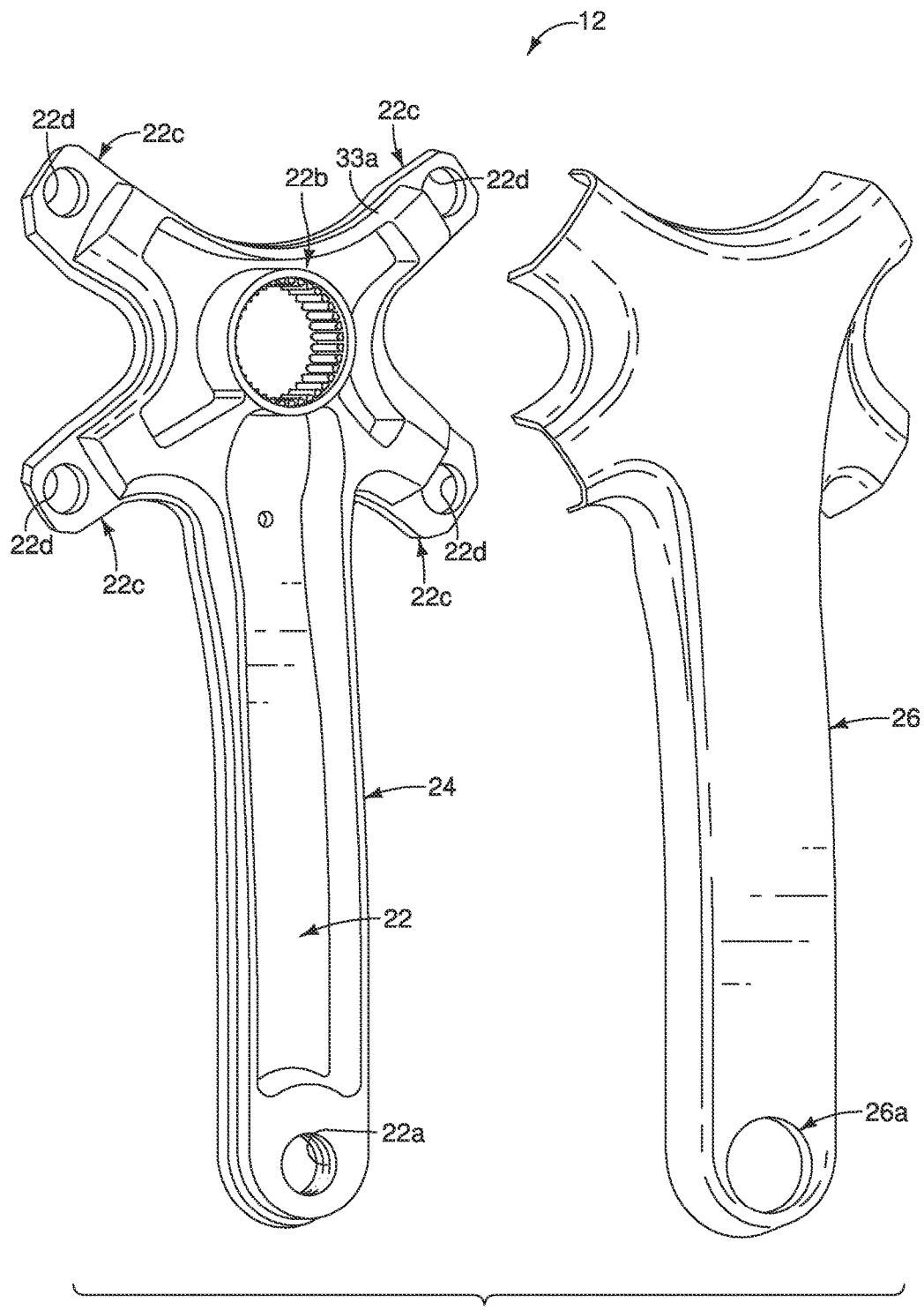
FIG. 3 is an exploded perspective view of a right crank arm of the bicycle crank assembly illustrated in FIGS. 1 and 2.

As seen in FIG. 3, the base member 22 is a single metal piece such as a forged metal piece. The base member 22 has a threaded hole 22a for attaching a pedal at its free end. The base member 22 has a crank axle attachment part 22b that has internal splines to be non-rotatably attached to the crank axle 16 in a conventional manner. Four chain ring attachment parts 22c extend outwardly from the crank axle attachment part 22b. Each of the chain ring attachment parts 22c has a mounting hole 22d for fixedly attaching the chain rings 18 and 20 using a fixing bolt (not shown) in a conventional manner.

The support member 24 is fixedly secured directly to a contact surface 28 of the base member 22 to reinforce the rigidity of the crank arm 12. In the illustrated embodiment of FIGS. 1 to 6, the support member 24 is attached to the base member 22 without using an adhesive. The support member 24 can be attached to the front cover member 26 with an adhesive (see FIG. 7) or without using an adhesive (see FIG. 9). Preferably, the support member 24 is attached to the base member and/or the cover member 26 by an integral molding process without using an adhesive so that a process for applying an adhesive can be omitted.

Figure 4:
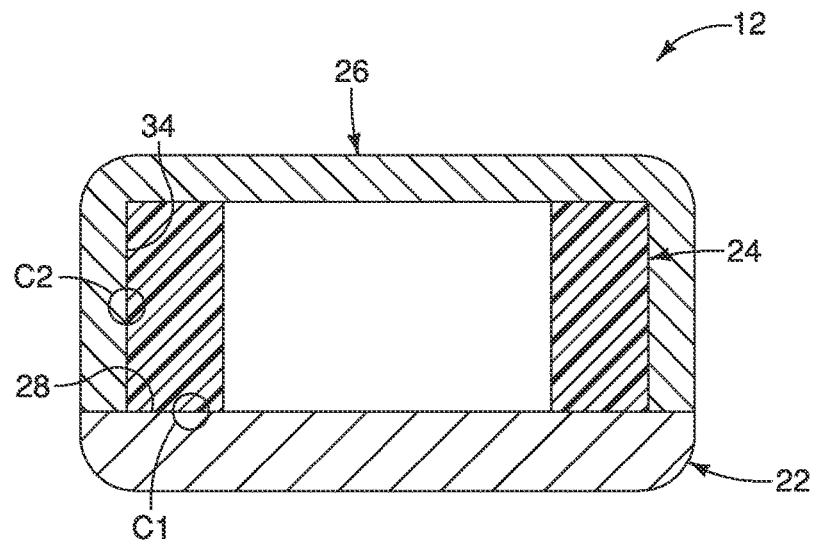
FIG. 4 is an enlarged, cross sectional view of a portion of the right crank arm in FIGS. 1 and 2 as seen along section line 4-4 of FIG. 1.
Figure 5:
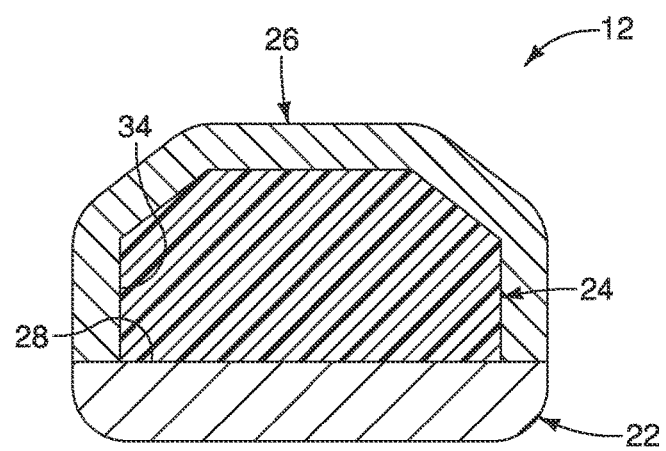
FIG. 5 is an enlarged, cross sectional view of a portion of the right crank arm in FIGS. 1 and 2 as seen along section line 5-5 of FIG. 1.
Figure 6:
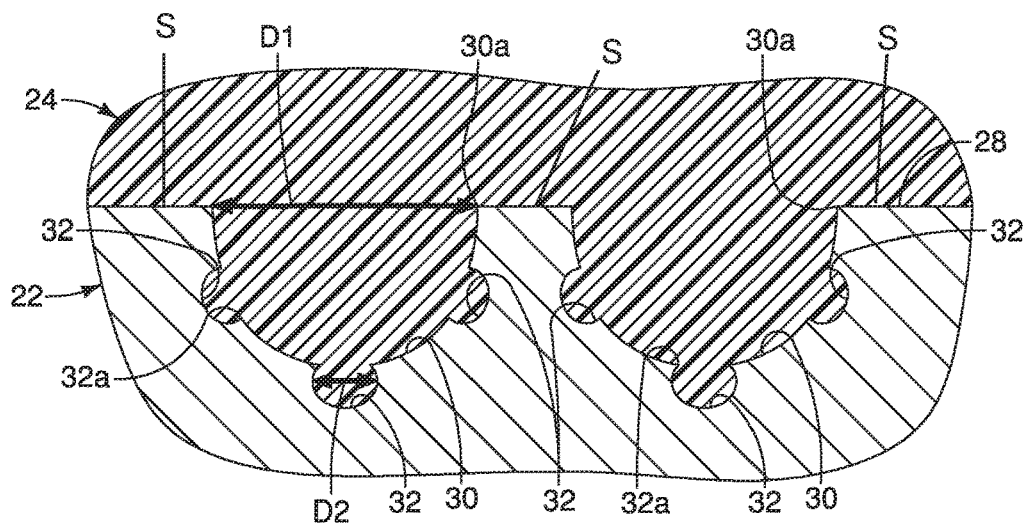
FIG. 6 is an enlarged, cross sectional view of a portion of the right crank arm in FIGS. 1 and 2 that is identified with the circle C1 in FIG. 4.
Figure 7:
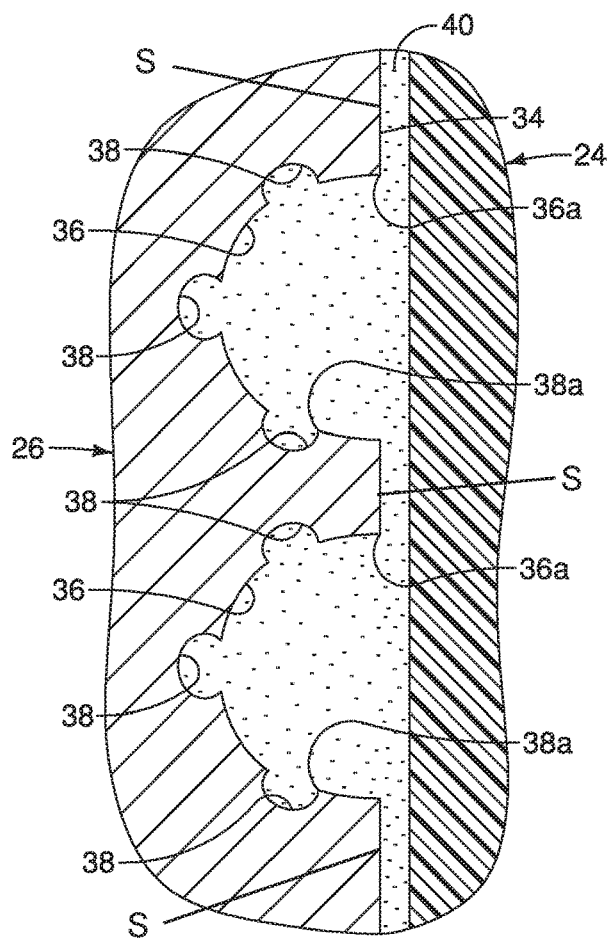
FIG. 7 is an enlarged, cross sectional view of a portion of the right crank arm in FIGS. 1 and 2 that is identified with the circle C2 in FIG. 4.
Figure 8:
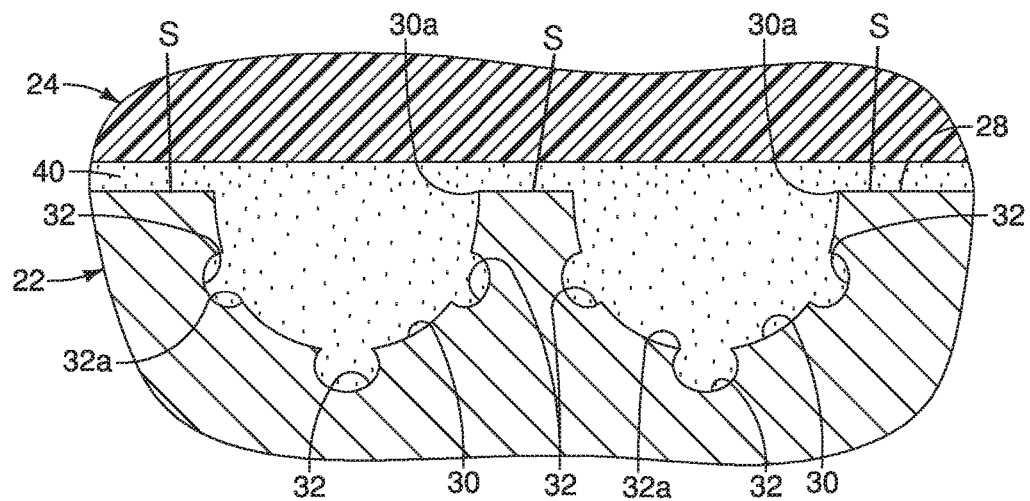
FIG. 8 is an enlarged, cross sectional view, similar to FIG. 6, of a modified right crank arm, in which the right crank arm of FIGS. 1 and 2 has been modified such that the base member and the cover member are adhesively attached together to form a non-separable unit.
Figure 9:
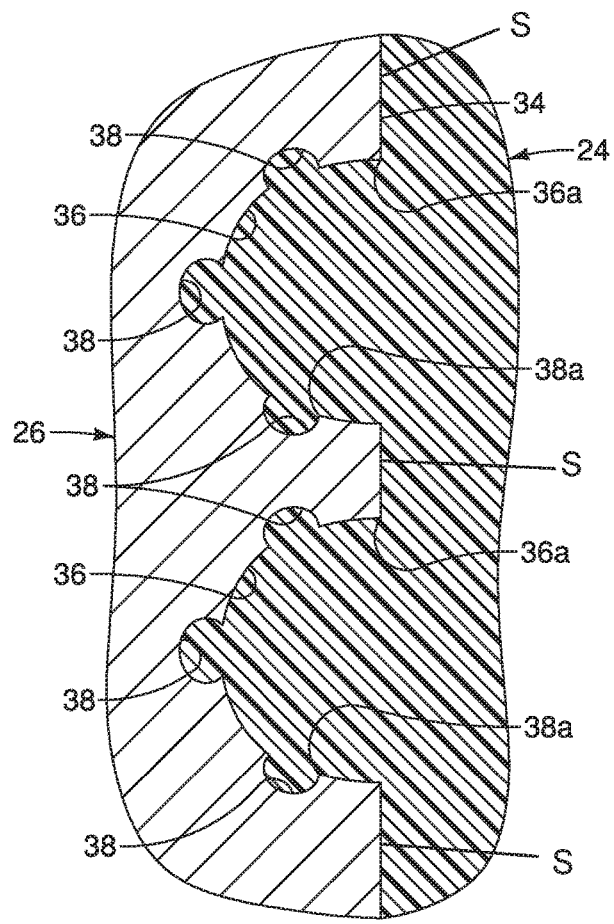
FIG. 9 is an enlarged, cross sectional view, similar to FIG. 7, of the modified right crank arm of FIG. 8.

Basically, the support member 24 (i.e. second member) is attached to the base member 22 without using an adhesive by integrally molding the support member 24 to the base member 22. For example, the support member 24 can be made by using a suitable number of prepreg sheets (e.g., carbon fiber cloth impregnated with resin) that are cut into the desired shape, and then using conventional molding techniques, the prepreg sheets are heated such that the resin of the prepreg sheets form the desired shape of the support member 24 as shown in FIGS. 3 to 5. When the resin of prepreg sheets of the support member 24 is heated, the resin also melts and bonds to the base member 22 and/or the front cover member 26 as explained below. In other words and preferably, the support member 24 can be attached to both the base member 22 and the front cover member 26 without using an adhesive, or can be attached to one of the base member 22 and the front cover member 26 without using an adhesive and adhesively attached to the other of the base member 22 and the front cover member 26. In the illustrated embodiment of FIGS. 1 to 7, the support member 24 is attached to the base member 22 without using an adhesive as seen in FIG. 6, while the front cover member 26 is adhesively attached to the support member 24 and the base member 22 as seen in FIG. 7. However, as illustrated in FIG. 8, the support member 24 can be adhesively attached to the base member 22 as discussed below. Moreover, as illustrated in FIG. 9, the support member 24 can be attached to the front cover member 26 as discussed below.

As mentioned above, in the illustrated embodiment of FIGS. 1 to 7, the support member 24 is securely attached to the surface 28 of the base member 22 without using an adhesive. In particular, the surface 28 of the base member 22 (i.e. first member) is provided with at least one first dimple 30, preferably a plurality of first dimples 30 as seen in FIG. 6, which is an enlarged cross sectional portion of the area (the bonding interface) within the circle C1 in FIG. 4. Thus, a composite bicycle component according to the present invention comprises a first member having a surface with a first dimple, and preferably, the first member has a plurality of the first dimples. The size of the first dimples 30 is shown in an exaggerated scale for illustration purposes, and the actual size is not shown. Since the surface 28 is a hidden surface, the entire area of the surface 28 can include the first dimples 30. Alternatively, the first dimples 30 can be formed only in the areas of the surface 28 which contact resin of the support member 24. The number of the first dimples 30 per unit of area depends on the desired bonding strength. Thus, the density of the first dimples 30 can vary over the surface 28 as needed and/or desired.

In the illustrated embodiment, the first dimples 30 each have an opening 30a that opens at the surface 28. The openings 30a are substantially circular. However, the first dimples 30 can have other shapes as needed and/or desired. Each of the first dimples 30 preferably has a maximum dimension D1 that is equal to or smaller than two microns. In such a case, the first dimples 30 are not visible with the naked eye. The first dimples 30 are separated by a flat portion S of the surface 28. Generally, the smallest dimple that would be visible to the naked eye would be about forty microns. Thus, the surface 28 appears to be a smooth, even surface to the naked eye if the maximum dimension D1 of the first dimple 30 is smaller than forty microns.

In the illustrated embodiment, the base member 22 (i.e. first member) has at least one second dimple 32, preferably a plurality of second dimples 32 formed on each of the first dimples 30. Thus, a composite bicycle component according to the present invention comprises a first member having a surface with a first dimple including a second dimple formed on the first dimple. However, some of the first dimples 30 can be formed without the second dimples 32 as needed and/or desired. Also, the first dimples 30 of the base member 22 can be formed with only one of the second dimples 32 on each of the first dimples 30, or some of the first dimples 30 having only one of the second dimples 32. In other words, the number of the second dimples 32 formed on the first dimples 30 can also vary between the first dimples 30 as needed and/or desired. Thus, while each of the first dimples 30 has a plurality of the second dimples 32 in the illustrated embodiment, the first dimples 30 of the base member 22 are not limited to the illustrated embodiment. The first and second dimples 30 and 32 are formed on the base member 22 by using a mechanical process and/or a chemical process.

In the illustrated embodiment, the second dimples 32 each have an opening 32a that opens at the surface of the first dimples 30. The openings 32a are substantially circular. However, the second dimples 32 can have other shapes as needed and/or desired. Each of the second dimples 32 has a maximum dimension D2 that is equal to or smaller than 0.2 micron. Thus, the maximum dimension D1 of the first dimples 30 is larger than the maximum dimension D2 of the second dimples 32.

By forming the first and second dimples 30 and 32 on the base member 22, the resin of the support member 24 (i.e. second member) extends into the first and second dimples 30 and 32 of the base member 22 (i.e. first member) to create an anchor effect that securely fixes the support member 24 to the base member 22. Preferably, the support member 24 is fixedly secured to the base member 22 by an integral molding process so that the resin of the support member 24 extends into the first and second dimples 30 and 32 of the base member 22 during the formation of the support member 24. The term "integral molding process" as used herein refers to molding of the second member (e.g., the support member 24), which is at least partially made of resin, while simultaneously attaching the second member (e.g., the support member 24) to the first member (e.g., the base member 22), which includes dimples for receiving the resin.

In the illustrated embodiment of FIGS. 1 to 7, the front cover member 26 is an outer shell that is constructed of a suitable rigid metal material that is, for example, an aluminum alloy with an alumite finish or other suitable materials such as, magnesium alloy, titanium alloy, or other light metal. As seen in FIGS. 4 and 7, the front cover member 26 has a bonding or contact surface 34 in which the support member 24 is adhesively attached to the front cover member 26. In particular, the surface 34 of the front cover member 26 is provided with a plurality of first dimples 36 and a plurality of second dimples 38 as seen in FIG. 7, which is an enlarged cross sectional portion of the area (the bonding interface) within the circle C2 in FIG. 4, for receiving an adhesive 40. The first dimples 36 each have an opening 36a that opens at the surface 34. The second dimples 38 also each have an opening 38a that opens at the surface 34. The first and second dimples 36 and 38 are identical to the first and second dimples 30 and 32 of the base member 22. Thus, above descriptions of the first and second dimples 30 and 32 of the base member 22 apply to the first and second dimples 36 and 38 of the front cover member 26. Here, however, the adhesive 40 extends into the first and second dimples 36 and 38 of the front cover member 26 to create an anchor effect that securely fixes the support member 24 to the front cover member 26. While the support member 24 is illustrated without such dimples, it will be apparent from this disclosure that dimples such as the first and second dimples 36 and 38 can be formed on the support member 24 for receiving the adhesive 40.

Referring to FIGS. 8 and 9, modifications to the bonding interfaces between the base member 22 and the support member 24 and between the front cover member 26 and the support member 24 will now be discussed. FIG. 8 shows an enlarged cross sectional portion of the area (the bonding interface) within the circle C1 in FIG. 4 for this modification. On the other hand, FIG. 9 shows an enlarged cross sectional portion of the area (the bonding interface) within the circle C2 in FIG. 4 for this modification. From these modifications, it will be apparent from this disclosure that the base member 22 and the front cover member 26 can both be bonded to the support member 24 by adhesive 40, or that the base member 22 and the front cover member 26 can both be bonded to the support member 24 by the resin of the support member 24 without using an adhesive.

In particular, as illustrated in FIG. 8, the support member 24 can be adhesively attached to the base member 22 with the adhesive 40, which extends into the first and second dimples 30 and 32 of the base member 22 to create an anchor effect that securely fixes the support member 24 to the base member 22. While the support member 24 is illustrated in this modification without such dimples, it will be apparent from this disclosure that dimples such as the first and second dimples 30 and 32 can be formed on the support member 24 for receiving the adhesive 40 if needed and/or desired.

As illustrated in FIG. 9, the support member 24 can be attached to the front cover member 26 without using an adhesive during the integral molding process of the support member 24. In this way, the resin of the support member 24 extends into the first and second dimples 36 and 38 of the front cover member 26 to create an anchor effect that securely fixes the support member 24 to the front cover member 26 without using an adhesive.

Now, one manufacturing process of forming a composite bicycle component such as the crank arm 12 will be briefly discussed in view of the above discussion of the crank arm 12 illustrated in FIGS. 1 to 7. Basically, a first member (e.g., the base member 22 and/or the front cover member 26) is formed. The first member (e.g., the base member 22 and/or the front cover member 26) is formed with first and second dimples (e.g., the first and second dimples 30 and 32 and/or the first and second dimples 36 and 38) by using a mechanical process and/or a chemical process. Then, a second member (e.g., the support member 24) at least partially made of resin is formed such that the first and second members are attached to each other by an integral molding process so that the resin of the second member extends into the first and second dimples of the first member. In particular, the resin of the material used to form the second member (e.g., the support member 24) is heated such that the resin is melted and flows into the first and second dimples (e.g., the first and second dimples 30 and 32 and/or the first and second dimples 36 and 38). Then the resin of the second member (e.g., the support member 24) becomes hardened as the second member is cooled to room temperature. In this way, the first and second members are sufficiently locked together due to anchor effect resulting from the resin of the second member extending into not only the first dimple but also the second dimple.

Figure 10:
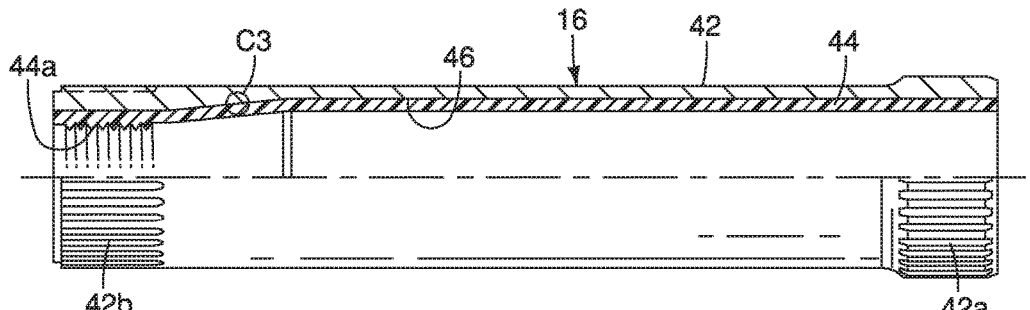
FIG. 10 is an elevational view of the crank axle of the bicycle crank assembly illustrated in FIG. 2, with an upper portion illustrated in cross-section for the purpose of illustration.
Figure 11:
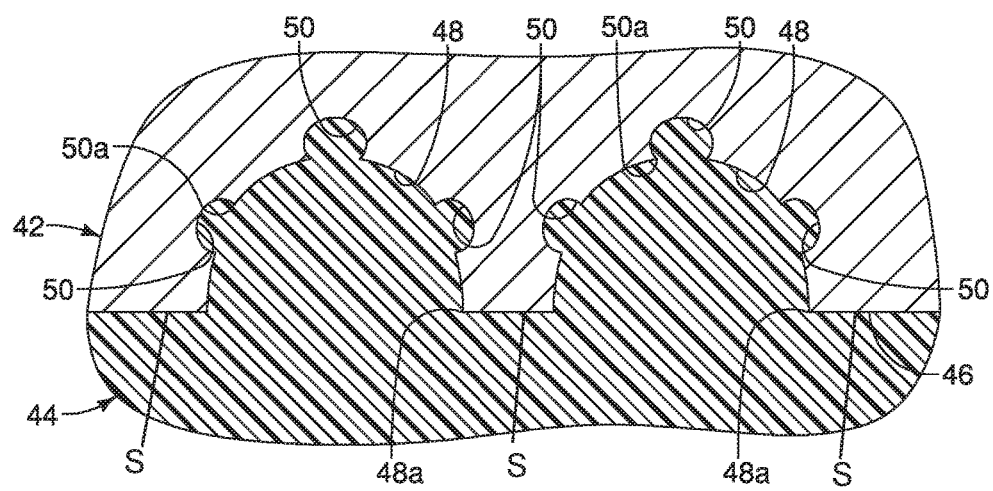
FIG. 11 is an enlarged, cross sectional view of a portion of the crank axle in FIG. 9 that is identified with the circle C3 in FIG. 10.
Figure 12:
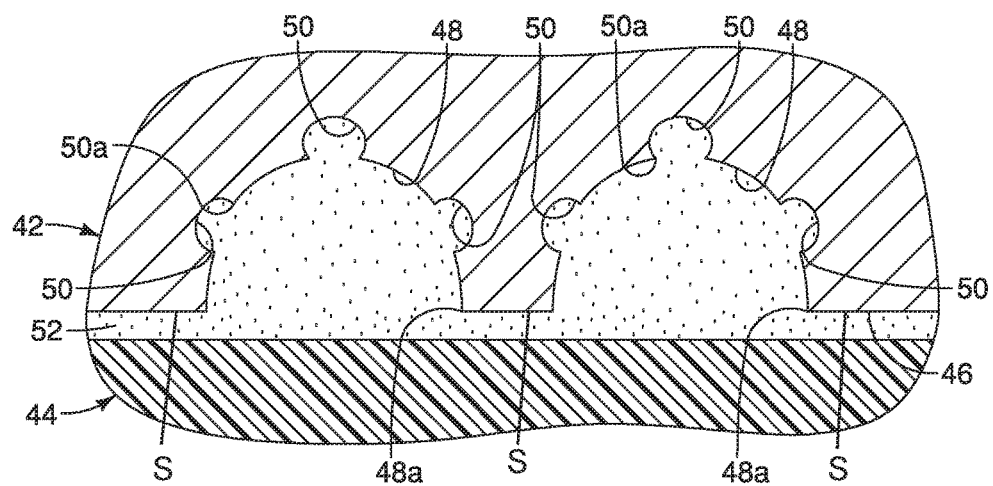
FIG. 12 is an enlarged, cross sectional view, similar to FIG. 11, of a modified crank axle, in which the crank axle of FIG. 9 has been modified such that the outer tubular member and an inner member are adhesively attached together to form a non-separable unit.
Figure 13:
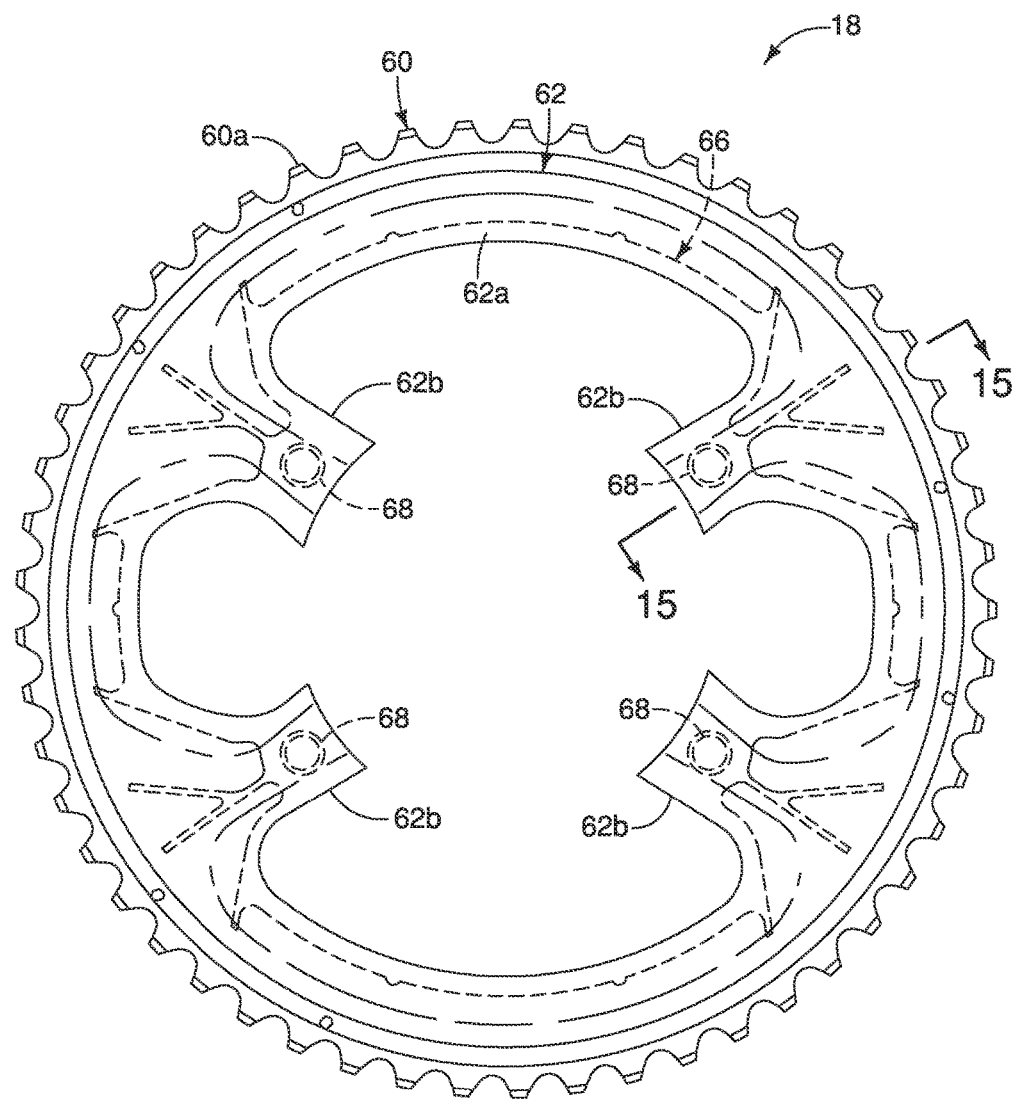
FIG. 13 is an outside elevational view of the outer chain ring of the bicycle crank assembly illustrated in FIG. 1.

Referring now to FIGS. 10 to 12, the construction of the crank axle 16 of the bicycle crank assembly 10 will now be discussed. The crank arms 12 and 14 are non-rotatably mounted to opposite ends of the crank axle 16 in a conventional manner. The crank axle 16 is configured to be rotatably supported by a bottom bracket structure (not shown) within a hanger tube of a bicycle (not shown) in a conventional manner. The crank axle 16 constitutes an example of a composite bicycle component. The crank axle 16 basically includes an outer tubular member 42 and an inner tubular member 44. The outer tubular member 42 is made of a metallic material (e.g., aluminum), and constitutes an example of a first member of a composite bicycle component. The inner tubular member 44 is made of a hard plastic resin or a fiber reinforced resin, and constitutes an example of a second member of a composite bicycle component. The inner tubular member 44 is attached within the outer tubular member 42 to form non-separable unit. The inner tubular member 44 is a support member that reinforces the outer tubular member 42.

In particular, the outer tubular member 42 has an internal surface 46, which is provided with a plurality of first dimples 48 as seen in FIGS. 11 and 12, which are enlarged cross sectional portions of the area (the bonding interface) within the circle C3 in FIG. 10. The size of the first dimples 48 is shown in an exaggerated scale for illustration purposes, and the actual size is not shown. In the illustrated embodiment, the outer tubular member 42 preferably includes a plurality of second dimples 50 formed on each of the first dimples 48. The inner tubular member 44 can be attached to the outer tubular member 42 without using an adhesive (see FIG. 11) or with an adhesive (see FIG. 12).

In the illustrated embodiment, the first dimples 48 each have an opening 48a that opens at the surface 46. The second dimples 50 also each have an opening 50a that opens at the surface 46. The first and second dimples 48 and 50 are identical to the first and second dimples 30 and 32 of the base member 22. Thus, above descriptions of the first and second dimples 30 and 32 of the base member 22 apply to the first and second dimples 48 and 50 of the outer tubular member 42.

By forming the first and second dimples 48 and 50 on the outer tubular member 42, as seen in FIG. 11, the resin of the inner tubular member 44 extends into the first and second dimples 48 and 50 of the outer tubular member 42 to create an anchor effect that securely fixes the inner tubular member 44 to the outer tubular member 42. Preferably, the inner tubular member 44 is fixedly secured to the outer tubular member 42 by an integral molding process so that the resin of the inner tubular member 44 extends into the first and second dimples 48 and 50 of the outer tubular member 42 during the formation of the inner tubular member 44. In this way the inner tubular member 44 is fixedly secured to the outer tubular member 42 without using an adhesive.

One manufacturing process of forming a composite bicycle component such as the crank axle 16 will now be briefly discussed. Basically, in manufacturing the crank axle 16, a first member (e.g., the outer tubular member 42) is formed. The first member (e.g., the outer tubular member 42) is formed with first and/or second dimples by using a mechanical process and/or a chemical process. Then, a second member (e.g., the inner tubular member 44) at least partially made of resin is formed such that the first and second members are attached to each other by an integral molding process so that the resin of the second member extends into the first and second dimples of the first member. In particular, the resin of the material used to form the second member (e.g., the inner tubular member 44) is heated such that the resin is melted and flows into the first and second dimples of the first member (e.g., the outer tubular member 42). Then the resin of the second member (e.g., the inner tubular member 44) becomes hardened as the second member is cooled to room temperature. In this way, the first and second members are sufficiently locked together due to anchor effect resulting from the resin of the second member extending into not only the first dimple but also the second dimple.

However, as seen in FIG. 12, the inner tubular member 44 can be fixedly secured to the outer tubular member 42 by an adhesive 52. Specifically, the adhesive 52 extends into the first and second dimples 48 and 50 of the outer tubular member 42 to create an anchor effect that securely fixes the inner tubular member 44 to the outer tubular member 42. While the inner tubular member 44 is illustrated without such dimples, it will be apparent from this disclosure that dimples such as the first and second dimples 48 and 50 can be formed on the inner tubular member 44 for receiving the adhesive 52.

Referring now to FIGS. 13 to 25, the construction of the chain ring 18 (i.e. a bicycle sprocket) of the bicycle crank assembly 10 will now be discussed. The outer chain ring 18 (i.e., an example of a composite bicycle component) is non-rotatably mounted to the crank arm 12 in a conventional manner. The crank axle 16 basically includes a tooth member 60, a front cover member 62, a base member 64 and a support member 66. The front cover member 62 and the base member 64 are each made of a metallic material (e.g., aluminum), and constitute examples of a first member of a composite bicycle component. The support member 66 is made of a hard plastic resin or a fiber reinforced resin, and constitutes an example of a second member of a composite bicycle component. The tooth member 60 and the support member 66 are disposed between the front cover member 62 and the base member 64 to form non-separable unit. Preferably, as in the illustrated embodiment, the outer chain ring 18 includes a plurality of mounting nuts 68 or other suitable mounting structures. Here, in the illustrated embodiment, the mounting nuts 68 (mounting structures) are partially embedded in the support member 66 and extend through the base member 64, and are not visible from the front side of the outer chain ring 18. The mounting nuts 68 each have a threaded hole 68a for receiving a fixing bolt (not shown).

Figure 16:
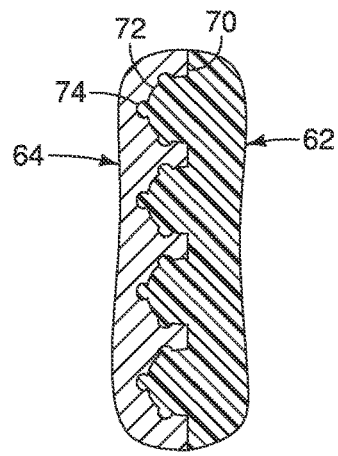
FIG. 16 is an enlarged, cross sectional view of a portion of the outer chain ring in FIGS. 1, 13 and 14 that is identified with the circle C4 in FIG. 15.
Figure 17:
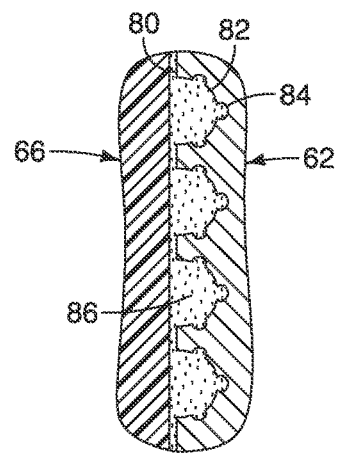
FIG. 17 is an enlarged, cross sectional view of a portion of the right crank arm in FIGS. 1 and 2 that is identified with the circle C5 in FIG. 15.

Basically, in the illustrated embodiment, the support member 66 is attached to the base member 64 without using an adhesive by using the resin of the support member 66 as a bonding material (see FIG. 16), while the support member 66 is adhesively attached to the front cover member 62 (see FIG. 17). The front cover member 62 and the base member 64 are both adhesively attached to one of the axial faces of the tooth member 60 (see FIGS. 18 and 19). Alternatively, the support member 66 can be adhesively attached to the base member 64 (see FIG. 20). Also, the support member 66 can be attached to the front cover member 62 without using an adhesive by using the resin of the support member 66 as a bonding material (see FIG. 21). The support member 66 can also be attached to both of the front cover member 62 and the base member 64 without using an adhesive by using the resin of the support member 66 as a bonding material.

In particular, as seen in FIG. 16, the base member 64 has an internal surface 70, which is provided with a plurality of first dimples 72. The size of the first dimples 72 is shown in an exaggerated scale for illustration purposes, and the actual size is not shown. In the illustrated embodiment, the base member 64 preferably includes a plurality of second dimples 74 formed on each of the first dimples 72. Here, the resin of the support member 66 is used as a bonding material that extends into the first and second dimples 72 and 74 of the base member 64 to create an anchor effect that securely fixes the support member 66 to the base member 64 without using an adhesive. Preferably, the support member 66 is fixedly secured to the base member 64 by an integral molding process so that the resin of the support member 66 extends into the first and second dimples 72 and 74 of the base member 64 during the formation of the support member 66. The first and second dimples 72 and 74 are identical to the first and second dimples 30 and 32 of the base member 22. Thus, above descriptions of the first and second dimples 30 and 32 of the base member 22 apply to the first and second dimples 72 and 74 of the base member 64.

Similarly, as seen in FIG. 17, the front cover member 62 has an internal surface 80, which is provided with a plurality of first dimples 82. The size of the first dimples 82 is shown in an exaggerated scale for illustration purposes, and the actual size is not shown. In the illustrated embodiment, the front cover member 62 preferably includes a plurality of second dimples 84 formed on each of the first dimples 82. An adhesive 86 is used as a bonding material that extends into the first and second dimples 82 and 84 of the front cover member 62 to create an anchor effect that securely fixes the support member 66 to the front cover member 62. The first and second dimples 82 and 84 are identical to the first and second dimples 30 and 32 of the base member 22. Thus, above descriptions of the first and second dimples 30 and 32 of the base member 22 apply to the first and second dimples 82 and 84 of the front cover member 62.

Figure 18:
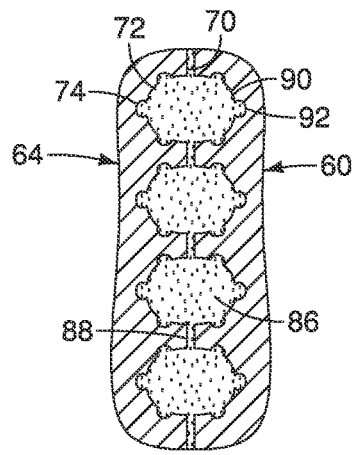
FIG. 18 is an enlarged, cross sectional view of a portion of the outer chain ring in FIGS. 13 and 14 that is identified with the circle C6 in FIG. 15.
Figure 19:
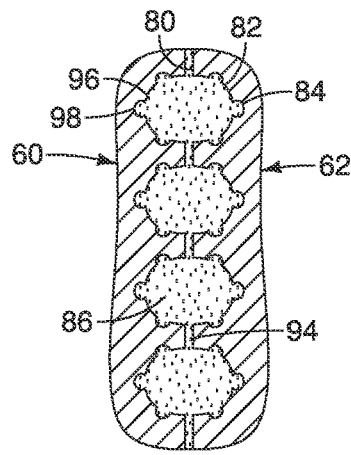
FIG. 19 is an enlarged, cross sectional view of a portion of the right crank arm in FIGS. 1 and 2 that is identified with the circle C7 in FIG. 15.
Figure 20:
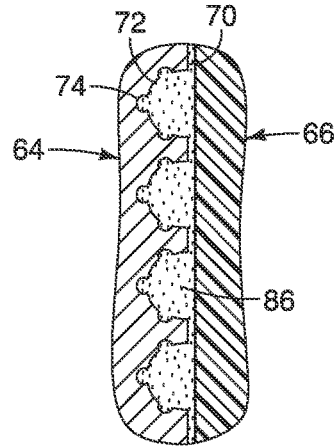
FIG. 20 is an enlarged, cross sectional view, similar to FIG. 16, of a portion of a modified outer chain ring, in which the outer chain ring of FIGS. 1, 13 and 14 has been modified such that the base member and the fixing member are adhesively attached together to form a non-separable unit.

As seen in FIGS. 18 and 19, the tooth member 60 is adhesively attached to the surface 70 of the base member 64 (see FIG. 18) and the surface 80 of the front cover member 62 (see FIG. 19) by an adhesive 86. In the illustrated embodiment, the tooth member 60 has a first surface 88, which is provided with a plurality of first dimples 90 and a plurality of second dimples 92 formed on each of the first dimples 90, for receiving the adhesive 86. Similarly, the tooth member 60 has a second surface 94, which is provided with a plurality of first dimples 96 and a plurality of second dimples 98 formed on each of the first dimples 96, for receiving the adhesive 86.

Referring back to FIGS. 13 to 15, the main parts of the chain ring 18 will be discussed in more detail. However, the bonding of the main parts of the chain ring 18 is not limited to the particular illustrated embodiment of the chain ring 18.

Figure 14:
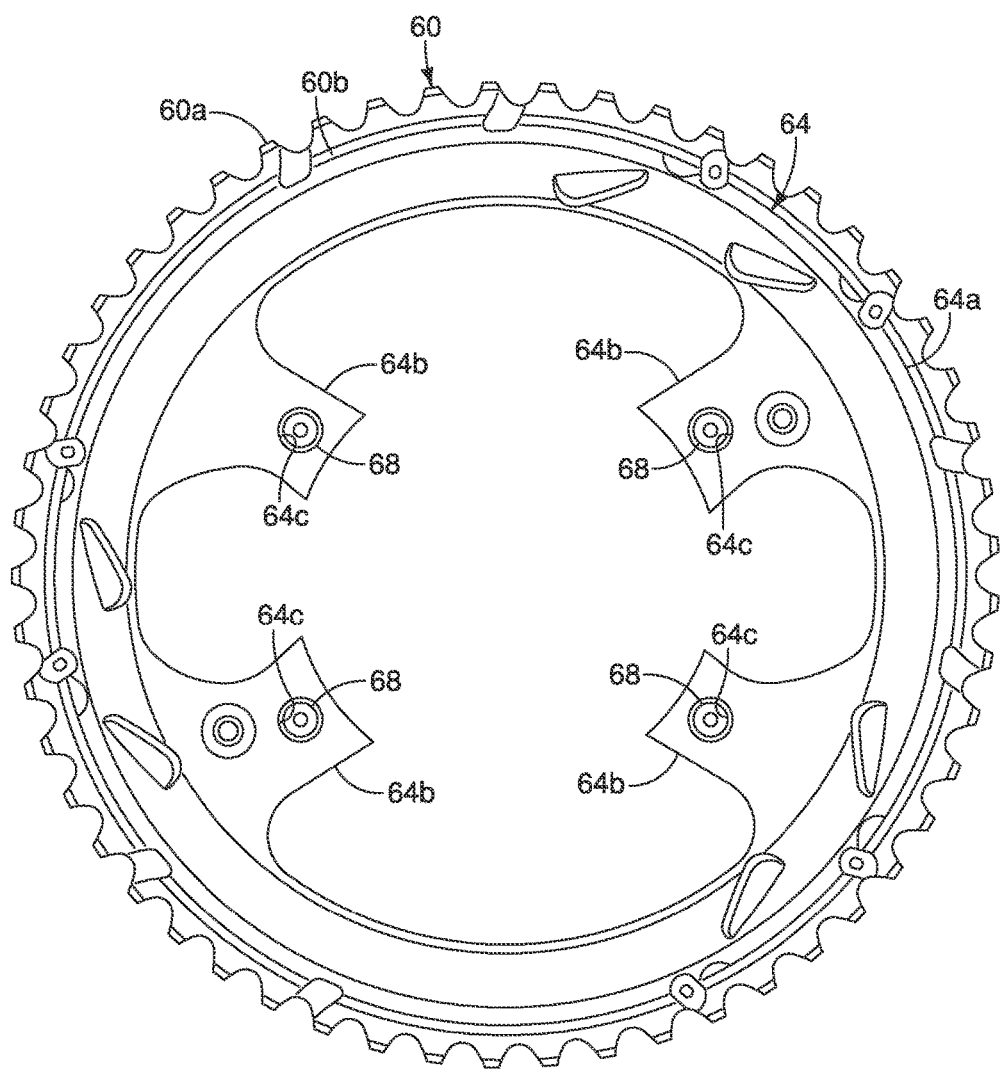
FIG. 14 is an inside elevational view of the outer chain ring of the bicycle crank assembly illustrated in FIGS. 1 and 13.
Figure 15:
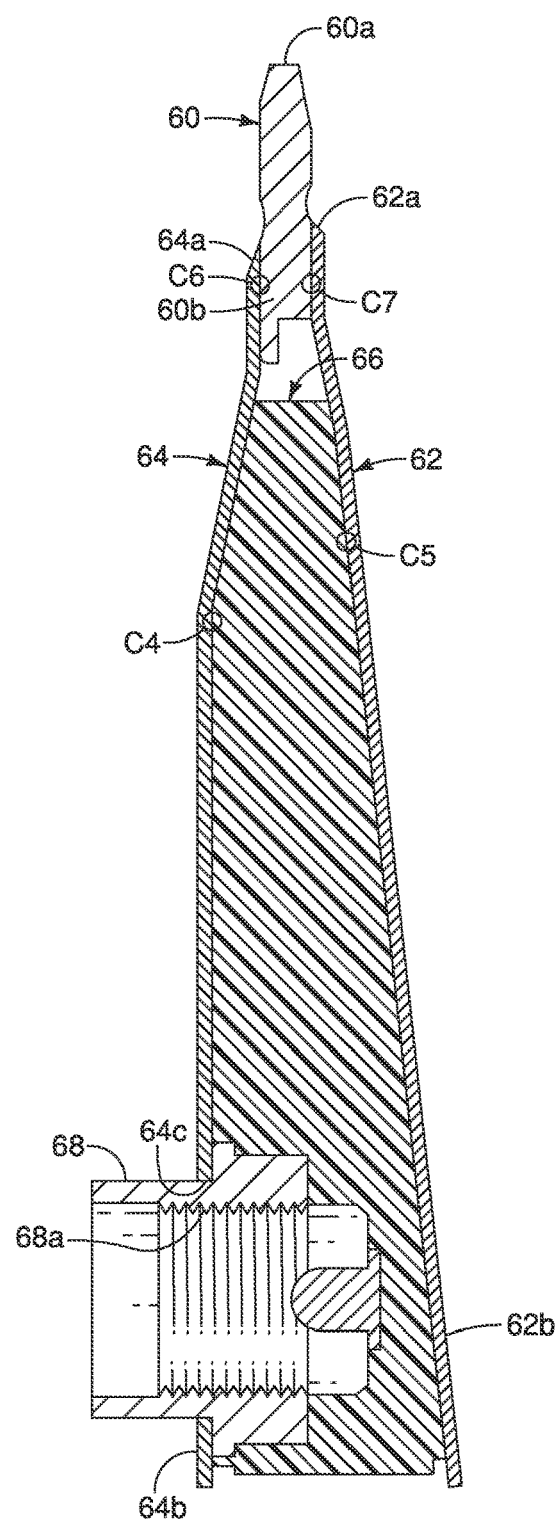
FIG. 15 is an enlarged, cross sectional view of a portion of the outer chain ring in FIGS. 1, 13 and 14 as seen along section line 15-15 of FIG. 13.

The tooth member 60 is a metal ring shaped member that has a plurality of teeth 60a and a fixing part 60b. Typically, the teeth 60a and a fixing part 60b are integrally formed as a one-piece, unitary member. The teeth 60a are formed on the outer periphery of the fixing part 60b. As seen in FIG. 14, the fixing part 60b can have one or more shift assist projections (not numbered) if needed and/or desired. While the teeth 60a are illustrated as straight teeth that are basically all identical, it will be apparent from this disclosure that the teeth 60a can have a variety of configurations as needed and/or desired. The fixing part 60b is fixedly attached to the front cover member 62 and the base member 64 by the adhesive 86. Alternatively, the fixing part 60b can be fixedly attached to the front cover member 62 and the base member 64 by welding or brazing.

Figure 21:
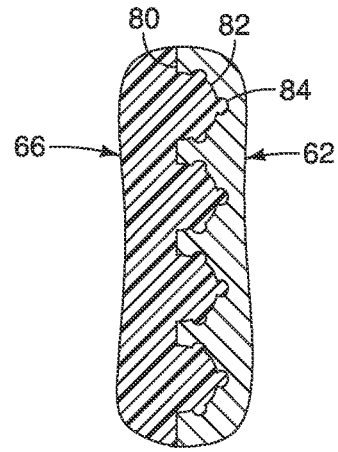
FIG. 21 is an enlarged, cross sectional view, similar to FIG. 17, of a portion of a modified outer chain ring, in which the outer chain ring of FIGS. 1, 13 and 14 has been modified such that the cover member and the fixing member are attached together to form a non-separable unit.

In the illustrated embodiment, the front cover member 62 is a stamped sheet metal member that is cut and bent to the desired shape. Here, the front cover member 62 basically includes an outer ring part 62a and a plurality of attachment parts 62b. The attachment parts 62b project radially inward from the inner periphery of the outer ring part 62a. As seen in FIGS. 17 and 19, the front cover member 62 is preferably adhesively attached to the tooth member 60 and the support member 66 by the adhesive 86. However, the front cover member 62 can be integrally attached to the support member 66 by the resin of the support member 66 during the formation of the support member 66 as seen in FIG. 21.

In the illustrated embodiment, the base member 64 is a stamped sheet metal member that is cut and bent to the desired shape. Here, the base member 64 basically includes an outer ring part 64a and a plurality of attachment parts 64b. The attachment parts 64b project radially inward from the inner periphery of the outer ring part 64a. Each of the attachment parts 64b includes an opening 64c for receiving a portion of the mounting nuts 68 therethrough. As seen in FIG. 16, the base member 64 is preferably integrally attached to the support member 66 by the resin of the support member 66 during the formation of the support member 66. As seen in FIG. 18, the base member 64 is preferably adhesively attached to the tooth member 60.

Figure 22:
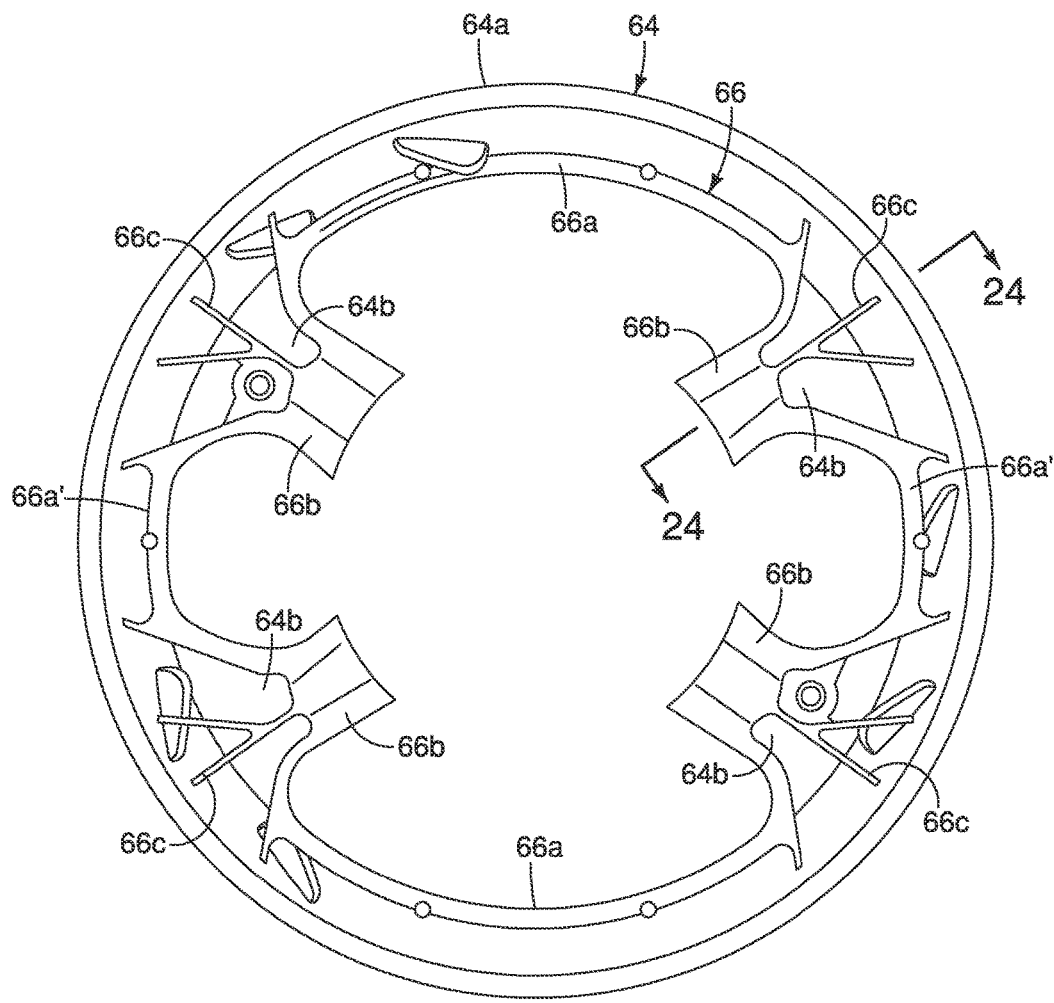
FIG. 22 is an front cover side elevational view of the base member and the fixing member for the outer chain ring of FIGS. 1, 13 and 14.
Figure 23:
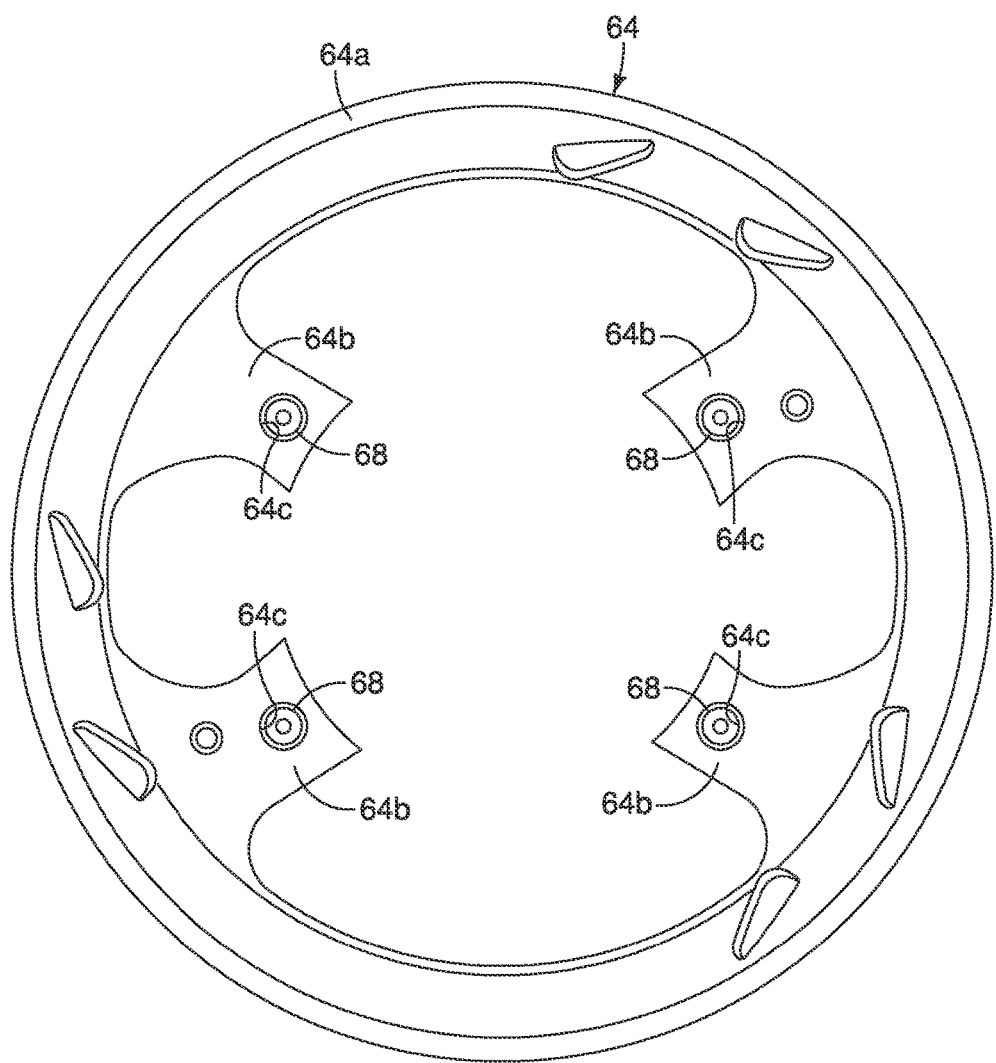
FIG. 23 is a base side elevational view of the base member and the fixing member of the outer chain ring of FIGS. 1, 13 and 14.
Figure 24:
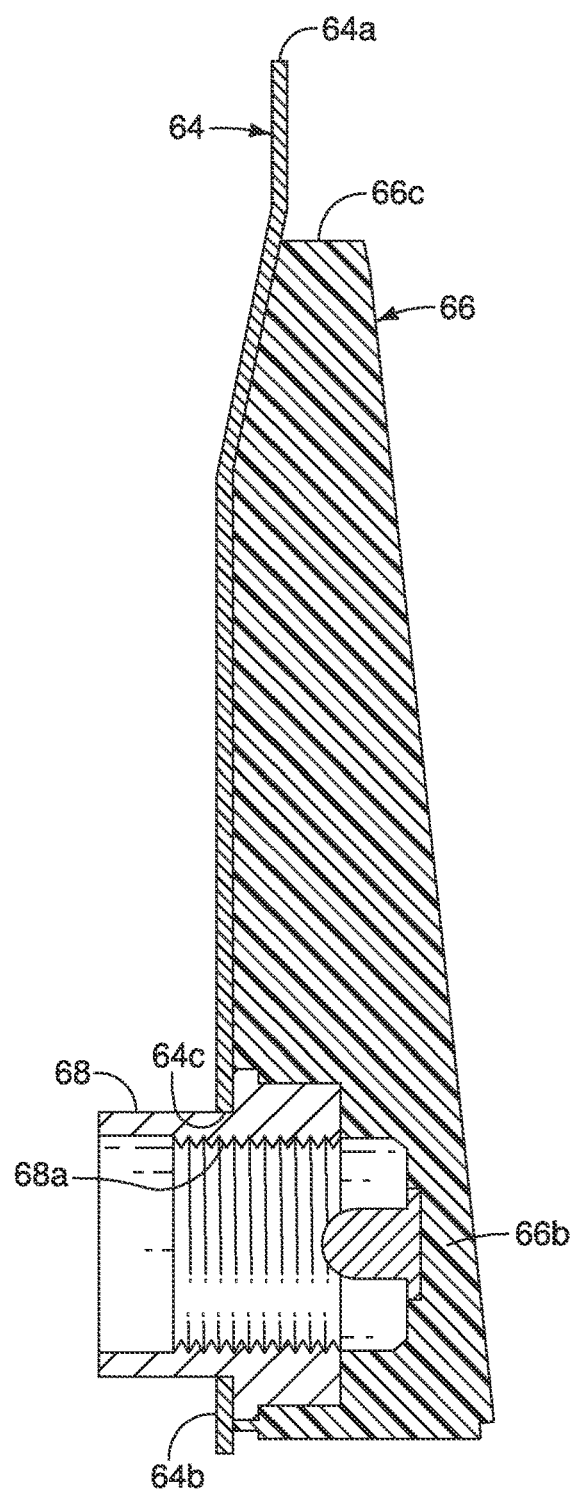
FIG. 24 is an enlarged, cross sectional view of a portion of the base member and the fixing member as seen along section line 24-24 of FIG. 22.

As seen in FIGS. 22 to 24, an integrated intermediate member is formed by the combination of the base member 64 and the support member 66. This intermediate member (i.e., the members 64 and 66) can now be adhesively attached to the tooth member 60 and the front cover member 62 by the adhesive 86 to form the final product. Alternatively, the base member 64 can be adhesively attached to the support member 66 by the adhesive 86 (see FIG. 20) to form the integrated intermediate member that is illustrated in FIGS. 22 to 23.

Figure 25:
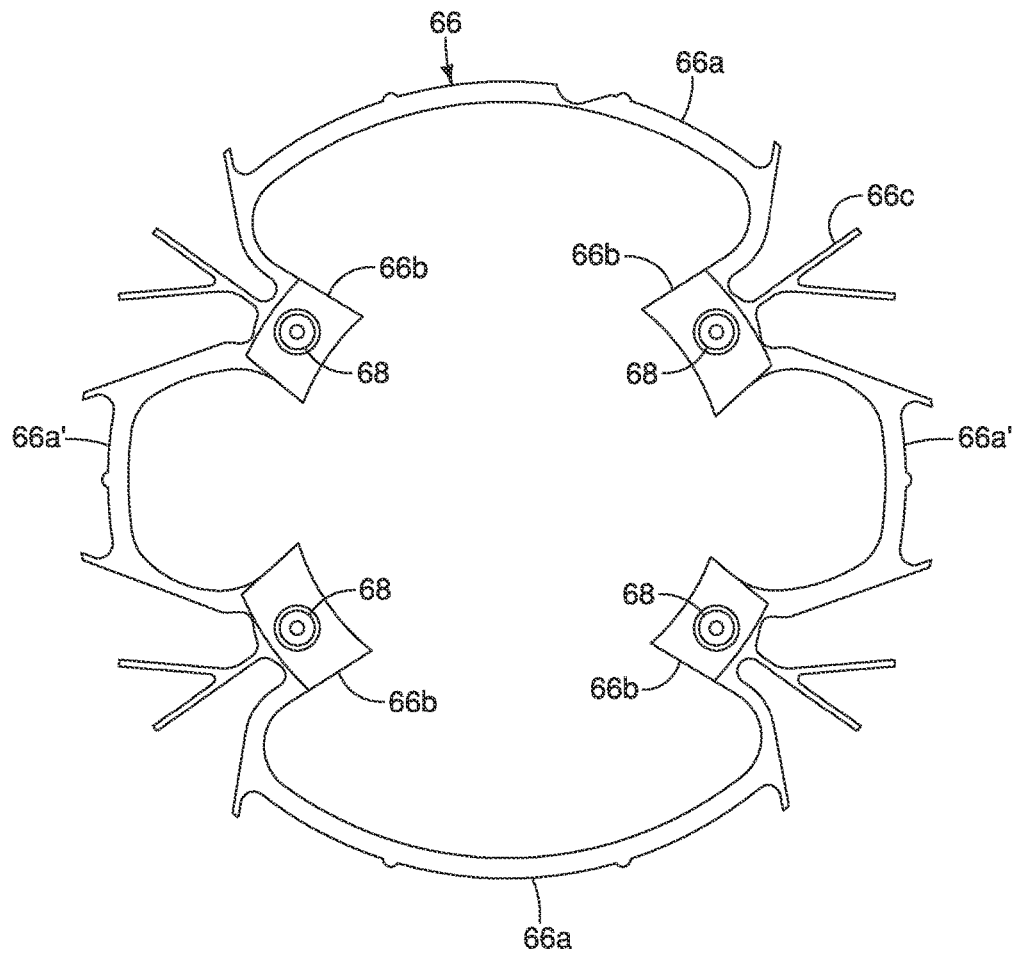
FIG. 25 is a front cover side elevational view of the fixing member for the outer chain ring of FIGS. 1, 13 and 14.

Referring now to FIG. 25, the support member 66 is illustrated by itself in its final form. Of course, it will be apparent form this disclosure that the shape of the support member 66 will vary depending on the configurations of the front cover member 62 and the base member 64. Here, the support member 66 is a ring shaped member that includes a pair of first outer parts 66a, a pair of second outer parts 66a', a plurality of attachment parts 66b and a plurality of support parts 66c. The attachment parts 66b interconnect the first and second outer parts 66a and 66a' in an alternating manner in the circumferential direction to form a continuous ring. The attachment parts 66b project radially inward from the first and second outer parts 66a and 66a'. Each of the attachment parts 66b has one of the mounting nuts 68 partially embedded therein. The attachment parts 66b are attached to the attachment parts 62b and 64b in the manner discussed above. The first and second outer parts 66a and 66a' are attached to the outer ring parts 62a and 64a in the manner discussed above. The support parts 66c are attached to both the outer ring parts 62a and 64a and the attachment parts 62b and 64b in the manner discussed above.

One manufacturing process of forming a composite bicycle component such as the chain ring 18 now will be briefly discussed. Basically, in manufacturing the chain ring 18, a first member (e.g., the base member 64) is formed. The first member (e.g., the base member 64) is formed with first and/or second dimples by using a mechanical process and/or a chemical process. Then, a second member (e.g., the support member 66) at least partially made of resin is formed such that the first and second members are attached to each other by an integral molding process so that the resin of the second member extends into the first and second dimples of the first member.

In particular, the resin of the material used to form the second member (e.g., the support member 66) is heated such that the resin is melted and flows into the first and/or second dimples of the first member (e.g., the base member 64). Then the resin of the second member (e.g., the support member 66) becomes hardened as the second member is cooled to room temperature. In this way, the first and second members are sufficiently locked together due to anchor effect resulting from the resin of the second member extending into not only the first dimple but also the second dimple. The tooth member 60 and the front cover member 62 can now be adhesively attached.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean a deviation amount of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A composite bicycle component comprising:
a first member made of a metallic material, the first member having a surface with a plurality of first dimples, each of the first dimples having a first opening with a maximum dimension that is smaller than 40 microns such that the first dimples are not visible to the naked eye and that the surface the first member is an even and regular surface that is free from perceptible projections, lumps or indentations, the first dimples being separated by a flat portion of the surface of the first member, each of the first dimples including a second dimple formed on the first dimple, each of the second dimples having a second opening that opens at a surface of one of the first dimples, the first and second openings being substantially circular, each of the second dimples having a maximum dimension that is larger than the second opening;
a second member including at least a portion being made of a resin, the resin of the second member extending into the first and second dimples of the first member to create an anchor effect to fix the first and second members to each other.

2. The composite bicycle component according to claim 1, wherein
the first member has a plurality of the second dimples formed on each of the plurality of the first dimples.

3. The composite bicycle component according to claim 1, wherein
the first dimple has a maximum dimension that is larger than a maximum dimension of the second dimple.

4. The composite bicycle component according to claim 1, wherein
the maximum dimension of the first dimple is equal to or smaller than two microns.

5. The composite bicycle component according to claim 4, wherein
the maximum dimension of the second dimple is equal to or smaller than 0.2 micron.

6. The composite bicycle component according to claim 1, wherein
the maximum dimension of the second dimple is equal to or smaller than 0.2 micron.

7. The composite bicycle component according to claim 1, wherein
the first and second members are attached to each other by an integral molding process.

8. The composite bicycle component according to claim 1, wherein
the first and second members are attached to each other by adhesive.

9. The composite bicycle component according to claim 1, wherein
the composite bicycle component being manufactured by the process of:
forming the first dimple and the second dimple on the first member.

10. The composite bicycle component according to claim 1, wherein
the composite bicycle component is a bicycle crank arm.

11. The composite bicycle component according to claim 1, wherein
the composite bicycle component is a bicycle sprocket.

12. The composite bicycle component according to claim 1, wherein
the composite bicycle component is a bicycle crank axle.

13. A composite bicycle component comprising:
a first member made of metallic material, the first member having a surface with a plurality of first dimples, each of the first dimples having a first opening with a maximum dimension that is smaller than 40 microns such that the first dimples are not visible to the naked eye and that the surface the first member is an even and regular surface that is free from perceptible projections, lumps or indentations, the first dimples being separated by a flat portion of the surface of the first member, each of the first dimples including a second dimple formed on the first dimple, each of the second dimples having a second opening that opens at a surface of one of the first dimples, the first and second openings being substantially circular, each of the second dimples having a maximum dimension that is larger than the second opening; and a second member including at least a portion being made of a resin, the resin of the second member extending into the first and second dimples of the first member to fix the first and second members to each other.

14. The composite bicycle component according to claim 13, wherein the first member has a plurality of the second dimples formed on each of the plurality of the first dimples.

15. The composite bicycle component according to claim 13, wherein the first dimple has a maximum dimension that is larger than a maximum dimension of the second dimple.

16. The composite bicycle component according to claim 13, wherein the maximum dimension of the first dimple is equal to or smaller than two microns.

17. The composite bicycle component according to claim 16, wherein the maximum dimension of the second dimple is equal to or smaller than 0.2 micron.

18. The composite bicycle component according to claim 13, wherein the maximum dimension of the second dimple is equal to or smaller than 0.2 micron.

19. The composite bicycle component according to claim 13, wherein the first and second members form a composite bicycle crank arm.

20. The composite bicycle component according to claim 13, wherein the first and second members form a composite bicycle sprocket.

21. The composite bicycle component according to claim 13, wherein the first and second members form a composite bicycle crank axle.

22. The composite bicycle component according to claim 13, wherein the composite bicycle component being manufactured by the process of:

forming the first dimple and the second dimple on the first member;

attaching the first and second members to each other by an integral molding process so that the resin of the second member at least partially extends into the first and second dimples of the first member.

* * * * *